(12) United States Patent
Dennis et al.

(10) Patent No.: US 12,149,089 B2
(45) Date of Patent: Nov. 19, 2024

(54) GRID-CONNECTED UNIDIRECTIONAL POWER SUPPLY

(71) Applicant: Faith Technologies, Inc., Menasha, WI (US)

(72) Inventors: Kevin Dennis, Menasha, WI (US); Nicholas James Chapin, Freedom, WI (US)

(73) Assignee: Faith Technologies, Inc., Menasha, WI (US)

( * ) Notice: Subject to any disclaimer, the term of this patent is extended or adjusted under 35 U.S.C. 154(b) by 0 days.

(21) Appl. No.: 17/831,152

(22) Filed: Jun. 2, 2022

(65) Prior Publication Data

US 2022/0399722 A1 Dec. 15, 2022

Related U.S. Application Data

(60) Provisional application No. 63/209,251, filed on Jun. 10, 2021.

(51) Int. Cl.
*H02J 3/38* (2006.01)
*H02J 3/32* (2006.01)
*H02J 9/06* (2006.01)

(52) U.S. Cl.
CPC ............ *H02J 3/381* (2013.01); *H02J 3/32* (2013.01); *H02J 9/061* (2013.01); *H02J 2300/24* (2020.01)

(58) Field of Classification Search
CPC .... H02J 3/381; H02J 3/32; H02J 9/061; H02J 2300/24
See application file for complete search history.

(56) References Cited

U.S. PATENT DOCUMENTS

2003/0062775 A1* 4/2003 Sinha ................. H02J 9/08 307/68
2017/0358929 A1* 12/2017 Koeppe ............... H02J 1/08

* cited by examiner

*Primary Examiner* — Robert L Deberadinis
(74) *Attorney, Agent, or Firm* — Randall W. Fieldhack

(57) ABSTRACT

A power system connectable to an electric utility grid includes a local bus connected to at least one non-grid source of electrical energy; an electrical connection between the local bus and an electric utility grid; and a unidirectional AC-to-DC power supply electrically interposed between the electric utility grid and the local bus, the power supply having an AC side and a DC side, wherein the power supply is configured to allow energy flow only from the AC side to the DC side.

20 Claims, 2 Drawing Sheets

GRID-CONNECTED UNIDIRECTIONAL POWER SUPPLY

BACKGROUND

The present application claims priority to the earlier-filed US Provisional Patent Application having Ser. No. 63/209,251, and hereby incorporates the subject matter of the provisional application in its entirety.

The present disclosure relates to energy use and generation, particularly to the use or delivery to a third-party power grid of energy generated by renewable energy resources or extracted from energy previously generated and then locally stored.

Rules and regulations allow an electric utility to control the delivery of power to and from a renewable energy source or locally stored energy and an electric utility grid through an inverter. The utility can also use the inverter for non-generation needs of the electric utility grid, such as power factor correction and modification or support of other characteristics of the alternating current (AC) waveform of the electric utility grid, to maintain stable performance of the electric utility grid. These inverters are known as grid-interactive or smart inverters. Underwriters Laboratories (UL) certifies smart inverters under the UL1741 SA standard to ensure the inverters embody software and hardware configured to meet these requirements. As a result, under certain operating conditions of the commercial electric utility grid, the renewable or other generated sources of energy cannot be delivered to a local load via the smart inverter because the smart inverter is in a grid interactive mode of operation.

Local power grids can generate and/or have available stored energy in the form of direct current (DC) electricity. These DC sources are often connected to a local user, such as one or more homes, businesses, or commercial or industrial buildings.

In short, an inverter connecting a local source of power and electricity must be enabled to prioritize requirements of the electric utility operating the electric utility grid. Such an inverter is capacity limited. Supplying non-revenue reactive or imaginary power to support the electric utility grid reduces the amount of real power the inverter can provide to a local load or user. The smart inverter can be considered congested if producing reactive power to meet an electric utility grid demand limits the amount of real power the inverter can provide. Because operation of the smart inverter is tied to the electric utility grid infrastructure and/or operation of the grid, the amount of energy or power actually supplied to the electric utility grid through the smart inverter can be unpredictable based on the present rules as well as expected future changes in electric utility grid connection rules. As a result, a local producer of renewable energy that is tied to the grid through a smart inverter cannot control nor easily predict the delivery of power and energy therefrom to the electric utility grid. This impacts flexibility in the use of the local storage and generation components such as a photovoltaic array of the local energy producer.

Furthermore, the electric utility grid's stability is affected by the timing and quantity of local sources trying to send power into the electric utility grid. As more renewable energy is deployed, electric utility grid stability must be maintained, resulting in further requirements to use smart inverters to support the electric utility grid infrastructure. It is expected that these requirements will migrate to other regions as the penetration of renewables increases.

SUMMARY

A system capable of operating in modes in which it is receiving power from the grid and in which it is not receiving power from the grid is provided using the following methodology and components to optimize energy production and usage without impacting the electric utility grid. The system integrates utility power into a microgrid without the use of smart inverters and requirements to comply with related standards and codes as well as interconnect agreements with utilities when using smart inverters.

The present disclosure describes a power system connectable to an electric utility grid including a local bus connected to at least one non-grid source of electrical energy; an electrical connection between the local bus and an electric utility grid; and a unidirectional AC-to-DC power supply electrically interposed between the electric utility grid and the local bus, the power supply having an AC side and a DC side, wherein the power supply is configured to allow energy flow only from the AC side to the DC side.

The present disclosure also describes a power system connectable to an electric utility grid including a local bus connected to at least one non-grid source of electrical energy; an electrical connection between the local bus and an electric utility grid; a local load connected to the local bus; and a unidirectional AC-to-DC power supply electrically interposed between the electric utility grid and the local bus, the power supply having an AC side and a DC side, wherein the power supply is configured to allow energy flow only from the AC side to the DC side, wherein the power system is configured to operate independently of the electric utility grid when energy supplied by the non-grid source of electrical energy is sufficient to supply the local load, and wherein the power system is configured to draw energy from the electric utility grid when energy supplied by the non-grid source of electrical energy is insufficient to supply the local load.

The present disclosure also describes a power system connectable to an electric utility grid, the power system including a first local bus connected to a first non-grid source of electrical energy, and a second local bus connected to a second non-grid source of electrical energy, wherein the second local bus is electrically connected to the first bus through a unidirectional regulator configured to allow electricity to pass from the second local bus to the first local bus and to block electricity flow from the first local bus to the second local bus, and wherein the second local bus is electrically connected to the electric utility grid through a bidirectional smart inverter.

The present disclosure also describes a power system connectable to an electric utility grid, the power system including a first local bus connected to a first non-grid source of electrical energy, wherein the first non-grid source of energy is a photovoltaic array, an energy storage system, or a generator; and a second local bus connected to a second non-grid source of electrical energy, wherein the second non-grid source of energy is a photovoltaic array, an energy storage system, or a generator, wherein the second local bus is electrically connected to the first bus through a unidirectional regulator configured to allow electricity to pass from the second local bus to the first local bus and to block electricity flow from the first local bus to the second local bus, and wherein the second local bus is electrically connected to the electric utility grid through a bidirectional smart inverter.

BRIEF DESCRIPTION OF THE DRAWINGS

So that the manner in which the above-recited features of the present disclosure can be understood in detail, a more particular description of various aspects, briefly summarized above, can be had by reference to the following description and the appended drawings. It is to be noted, however, that the appended drawings illustrate only typical implementations of this disclosure and is therefore not to be considered limiting of its scope, for the present disclosure might admit to other equally effective implementations.

Figure 1:
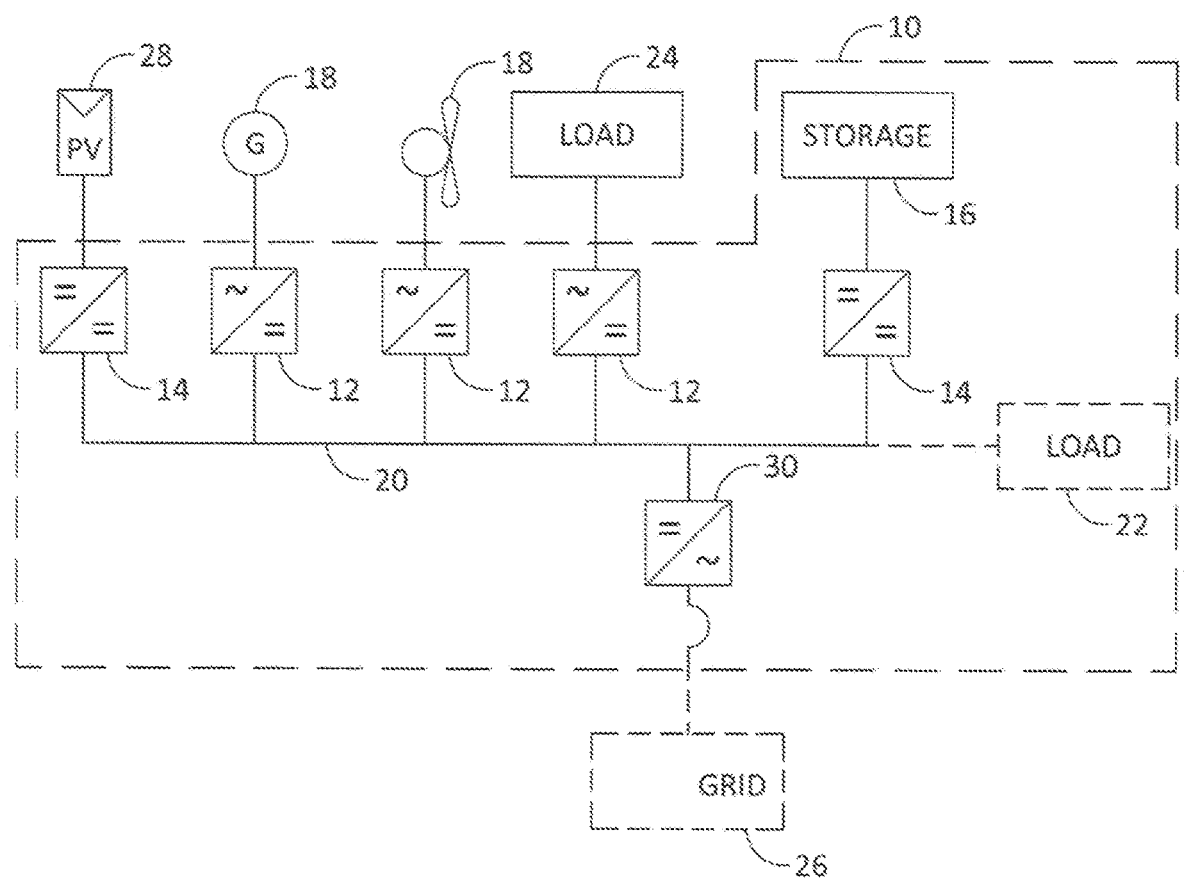
FIG. 1 is a schematic representation of a local generation and storage capacity of the present disclosure connected to a load and to an electric utility grid.

To facilitate understanding, identical reference numerals have been used, where possible, to designate identical elements that are common to the figure. It is contemplated that elements and features of one implementation can be beneficially incorporated in other implementations without further recitation.

DETAILED DESCRIPTION

The power system of the present disclosure is capable of operating in modes in which it is receiving power from the grid and in which it is not receiving power from the grid. The system integrates utility power into a microgrid without the use of smart inverters and requirements to comply with related standards and codes as well as interconnect agreements with utilities when using smart inverters.

The approach maintains the ability to still manage and control the power and power which is drawn from the utility grid and provides to utilize the grid power as an option and prioritized with other generating and storage assets for the optimal use of electrical power.

Rules and regulations allow an electric utility to control the delivery of power to and from a renewable energy source or locally stored energy and an electric utility grid through an inverter. The utility can also use the inverter for non-generation needs of the electric utility grid, such as power factor correction and modification or support of other characteristics of the AC waveform of the electric utility grid, to maintain stable performance of the electric utility grid. All have different rules and require interconnect permits.

In one example, a local utility calculates the overall capacity of a microgrid for determining what could possibly be pushed back to the grid, neglecting the inverter capacity that limits through control and overcurrent protection. This calculation can result in the utility placing the system in a higher category that imposes additional requirements on the customer. This is essentially an insurance policy for the utility. Because system-owned smart inverters are controlled by system software and not by the utility, the utility might assume that administrative limits placed on the potential feed to the grid through a smart inverter can be altered by the system owner, thus circumventing utility connection rules.

A smart inverter is capable of passing up to a rated amount of power therethrough, as well as being able to receive commands changing the amount of energy or power that can pass therethrough. The capacity of the smart inverter includes the output on the AC side of the smart inverter in terms of real power measured in kW and kWh and imaginary or reactive power measured in kVA and kVAR. A smart inverter certified for interaction with the electric utility grid includes the requirement that an inverter connected to the electric utility grid or operating in the grid following mode has the capability of supporting electric voltage, frequency, or voltage and frequency of AC power on the electric utility grid. Further, if the smart inverter cannot be so used, the amount of power the local grid can supply from the connected generation source (for example, a photovoltaic array) must be limited or discontinued. In either scenario, extraction of energy from the local generation source is ultimately curtailed and thus wasted if it cannot be stored on the DC input side of the inverter or otherwise fully used on the DC side of the inverter.

Typically, to receive permits to connect a local energy generating source to the electric utility grid, smart inverters must be used. The functionality override embodied in California law and the UL1741 SA standard for interconnection dictates the rules that prioritize the utility needs that in many cases result in the lost production from the local generating source. Lost production is typical where the electric utility grid will not accept the amount of power available for passing into the electric utility grid, local storage on the DC input side of the smart inverter is full and cannot accept more energy for storage, and local user(s) on the DC input side of the inverter cannot consume the total energy being locally generated. Lost production reduces the value of the renewable energy generation system on the local energy producer's side of the smart inverter and also curtails or prevents the use of the production of green or renewable energy.

The following are examples of potential lost production resulting from the connection of a local grid to an electric utility grid using a smart inverter configured to meet the UL1741 SA standard:

Volt/Watt: In this instance, if the electric utility grid voltage reaches an unacceptably high level based on electric utility operation standards, the kW output (the real component as opposed to the reactive component) of the inverter is limited or curtailed regardless of the local generation capacity on the DC input side of the inverter to produce kW. This is due to the fact that the export of more kW would have some impact to further increase the voltage on the electric utility grid.

Volt/VAR: The inverter technology in smart inverters has a capability of producing or absorbing volt-ampere reactive power (VARs) and not watts (real power). Anything up to the inverter's full volt-ampere (VA) capacity is subject to being used for the production of VARs to increase the utility voltage or absorption of VARs to decrease the electric utility grid voltage. When in this operational mode, the electric utility grid voltage can be in a range that requires the entire capacity of the inverter to generate or absorb kVARs. The inverter is thereby unable to pass wattage to the electric utility grid because it is producing only a reactive component of the power it creates by inverting the DC input thereto. Considering that nearly all generating sources are valued by their capability to generate electricity in watts and power in kWh, the electric utility grid's prioritization of the inverter's capacity to support grid performance effectively curtails the use of the local generating source(s) where any local storage on the local side of the inverter is filled, and local use of the generated electricity cannot consume that available. Delivery of power that could be generated from the local generating source(s) is limited by kVAR production or absorption by the smart inverter or prevented entirely from passing through the smart inverter to the electric utility grid. Note that the smart inverter output is based on kVA rating (not kW or kVAR), where the relationship is kVA= $(kW^2+kVar^2)1/2$. As a result, the electric utility grid's imposed priority on the smart inverter for VAR operation will diminish the capability of the inverter to deliver kilowatts available on the DC side of the smart inverter.

Constant Power Factor: Another priority of a smart inverter is to operate in a constant power factor mode as a condition of permitting interconnection of the local energy source to the electric utility grid. Understanding that the Power Factor is a ratio of kw/kVA and requiring the need to use part of the kVA capacity to generate VARs, the capacity of the inverter is reduced for the generation of kW (kWh).

Frequency/Watt: Similar to the Volt/Watt function defined above, resulting in limiting export of energy through the smart inverter to support frequency or reduce frequency variation on the electric utility grid.

Low and High Voltage Ride Thru (LHVRT): During electric utility grid under-voltage events, the system can be required to export power into the electric utility grid for up to 21 seconds. The percent level of export is dependent upon the grid voltage. In other words, the lower the grid voltage the higher the required export. The required export uses a look-up table or a ramp from 0-100%. Up to 21 seconds is an example of a standard condition, and exact details are called out in a utility agreement. The LHVRT acts to regulate or limit the operation of power generation. While the system is grid connected, these utility conditions are required to be met. During this period of time the capacity of the installed system is required to address these rules instead of other operations.

Low and High Frequency Ride Thru (LHFRT): Similarly, to prevent or correct over-frequency and under-frequency events, the system can be required to export power into the electric utility grid for up to 21 seconds. The capacity of the system is required to address the utility conditions as a priority in a manner that overrides system functionality to support the electric utility grid.

Solar ITC: Under certain utility rules, renewable energy including photovoltaics and batteries is not to be used for load, but rather to support the electric utility grid. This has impacted the rules that govern tax credits.

HECO Rule 14h: Hawaii Electric Co has a requirement that allows the utility to remotely enable/disable the inverter and to set the functions defined above, including the electric utility owner of the electric utility grid having the right to set the on and off power points of the smart inverter. This means the utility can change the rules and demands on the equipment as they wish to address their primary mission of grid stability, regardless of what the cause of the grid issue is. In other words, all assets must be first used as the grid requires.

A typical power system includes one or more generating sources and one or more storage options connected to a local bus. The local bus is connected to the DC side, or local generation and storage side, of a smart inverter. The AC or electric utility grid side of the smart inverter is connected to the electric utility grid. Energy supplied to the AC side of the smart inverter can be supplied therethrough to the DC side. In the event, however, that the electric utility grid chooses to curtail the amount of power passing through the smart inverter, or to control the inverter for voltage or frequency generation, grid stability control, or for other non-feed purposes, real power delivery through the smart inverter can be curtailed or eliminated. Thus, the electric utility operator of the electric utility grid can curtail the passage of kW into the electric utility grid.

When the smart inverter is interconnected to the electric utility grid, a local controller monitors the power passing through the point of connection on the AC side of the smart converter to the electric utility grid, and the smart inverter monitors the voltage and the AC frequency at its AC terminals.

A power system of the present disclosure eliminates the utility interconnection issues of a smart inverter by replacing the smart inverter with a standard grid AC-to-48VDC unidirectional power supply. Such a power supply is not grid interactive, meaning it does not synch with the grid nor does it have the capability to inject active/reactive power to the grid point of connection. As a result, the power system appears to the grid to be just another load on the grid. This power system provides for a connection to the utility grid; however, the power system can physically only draw power from the utility grid and never interact with the grid nor push power back to the grid. The power system can maintain the ability to use utility power when desired for overall system optimal operation. In comparison with using a grid-interactive or smart inverter, this approach can prove to the utility that no power will be supplied to the grid because the system is entirely incapable of doing so, no matter what settings are used.

In essence, the power supply acts as a check valve that allows power to flow from the grid to the local system when "pressure" on the grid is greater than that of the local system, and that closes to prevent flow in the opposite direction when "pressure" in the local system is greater than that of the grid. The local system remains grid connected but cannot supply power to the grid; the local system can only receive power from the grid. The purpose is to eliminate the need for a grid interconnection agreement with a utility while allowing the use of grid power as back up to photovoltaics and an energy storage system.

The DC output of the power supply can be coordinated with the generation and storage equipment also connected to the DC bus to strategically allow the configuration to prioritize generation sources, for example photovoltaics first, energy storage system second, and utility grid third.

A similar approach can be used when connecting an on-site generator to the DC bus. An interactive inverter can be used to manage power being drawn from the generator for optimal operation of generator and with only a maximum voltage "back off" similar to photovoltaics operation. This includes obtaining fuel savings by running the generator in an optimized manner in its base operating mode and switching off the generator when the energy storage system is full.

The power system can include isolation and bypass breakers or automatic transfer switch to allow the isolation of the micro grid and provide grid power directly to a customer load. This would be done for purposes of system maintenance and provides the customer with power as typically done by utility.

Further, with regard to generator output, the system described herein allows the removal of the complexity of AC coupling a generator and mode changes in the inverter (following to forming), where the inverter is always in forming mode. As noted above a generator input may use a following (grid interactive) inverter to manage the load drawn from the generator and does not impede the utility grid interconnect agreement.

In an example of operation of the power system of the present disclosure, power supply output set point is set to a VDC value. The power supply is non-conducting when voltage on the 48VDC bus is greater than the power supply voltage setpoint, thus assuring use of photovoltaics and energy storage system to supply the DC bus. The power supply voltage setpoint is set higher than the battery minimum voltage to protect battery from over discharge. The voltage setpoint is also higher than VDC minimum for inverter operation. The voltage setpoint can be adjustable to allow for battery charging from the grid in specific cases as determined by application.

In this example, no utility grid power is used when photovoltaics and/or energy storage system are able to support the load, and utility grid power is used as a backup only. By adjusting the voltage setpoint higher, utility grid power can be used to charge the energy storage system battery when utility grid power is at a lower cost through, for example, time of use rates or nighttime and to supply utility grid power directly to a load, for example in the event of insufficient sunlight and depleted energy storage system. The logic to maintain battery is less complex in this manner than via a smart inverter.

In a similar manner one or more power supplies may be used and set with the same voltage setpoint or with stepped voltage setpoints as needed for a particular application, meaning the power system can be modularly configurable.

If the system operator decides to avoid any utility grid power use, the voltage setpoint can be set such that no utility grid power will be drawn.

Conversely, the power system of the present disclosure can be used as an uninterruptible power supply that normally supplies power from the utility grid but seamlessly transitions to a generator, photovoltaics, and/or energy storage system in the event of a utility grid outage without the typical momentary outage inherent in an AC-coupled backup system.

To be clear, remaining grid connected does not necessarily mean that power is being received from the grid. The power supply can be capable of full output but only producing power that the load/customer is consuming.

Throughout this description, several terms will be used for describing the power conversion devices used to couple a generating source or load to a common DC bus including: a converter, a regulator, and an inverter. Each of the converter, regulator, and inverter include both a voltage signal and a control unit. The voltage signal indicates the voltage level present on the DC bus and can be generated by individual voltage sensors within each power conversion device, a single voltage sensor providing the signal to multiple power conversion devices, or a combination of voltage sensors providing a signal to individual power conversion devices and to multiple power conversion devices. The control unit of each power conversion device preferably includes a power conversion section, consisting of power electronic devices, a processor capable of executing a program to send control signals to the power electronic devices, and memory for storing the program capable of executing on the processor. The voltage signal is read by the program executing on the processor. The program outputs control signals to the power electronic devices to regulate power flow through the device as described in more detail below. Alternately, the control unit can be made up solely of the power electronic devices and control hardware connected directly to the voltage signal to regulate power flow through the device. For example, a boost converter, as is known in the art, can be used to convert a first DC voltage level to a higher, second DC voltage level.

Referring to FIG. 1, a basic power system 10 is illustrated. The power system 10 includes a converter 12 connected to each AC generating source 18. The power system 10 also includes a converter 12 connected to an AC load 24. The power system 10 can further include at least one optional regulator 14, where a regulator 14 can be connected to an energy storage device 16. Another regulator 14 optionally can be connected to a DC generating source 28. The regulators 14 are generally used to convert from one DC voltage to another DC voltage are not always needed if a voltage conversion is not needed.

A common DC bus 20 links each of the converters 12 and the regulators 14. The DC bus 20 can supply DC loads 22 and AC loads 24 and can receive power from an electric utility grid 26 via a unidirectional power supply 30.

Each converter 12 is electrically coupled between a generating source 18 or an AC load 24 and the common DC bus 20. The generating sources 18, 28 can be of any type known in the art, including but not limited to wind, photovoltaics, hydroelectric, tidal, biofuel, or biomass generating sources. Each of these sources 18, 28 outputs either an AC or a DC voltage with an amplitude suited to the type of generating source 18, 28. A generating source 18 provides an AC input voltage to the power electronics of the converter 12. The power electronics are configured to convert this AC input voltage to a desired DC voltage level as an output voltage to the DC bus 20. For example, the desired DC voltage level can be 650 volts if the power system connects to a 460-volt AC load 24 or an AC load/electric utility grid 26. Alternately, the DC voltage level can be any desired DC voltage, such as 48 volts, that can be required by a specific DC load 22. In another aspect, a regulator 14 can be interposed between the DC bus 20 and the DC load 22 to change the voltage delivered from the DC bus 20 to the DC load 22. The DC voltage level can similarly be selected to provide optimum energy conversion between a generating source 18 and the DC bus 20.

Similarly, a generating source 28 provides a DC input voltage to the power electronics of the regulator. The power electronics are configured to convert this DC input voltage to a desired, different DC voltage level as an output voltage to the DC bus 20.

A regulator 14 is also electrically coupled between a storage device 16 and the common DC bus 20. The storage device 16 can, for example, include a battery, a fuel cell, or a regenerative fuel cell. It is contemplated that each storage device 16 can be made of either a single device or multiple devices connected in series, parallel, or a combination thereof as is known in the art. The power electronics of the regulator 14 are configured to allow bidirectional power flow between the DC bus 20 and the storage device 16. The DC bus 20 operates at a first DC voltage level and the storage device 16 operates at a second DC voltage level. Alternately, the DC bus 20 and the storage device 16 can operate at the same DC voltage level.

The power system 10 can further include a power supply conversion device, for example a unidirectional AC-to-DC power supply 30. The power supply 30 is electrically coupled between the DC bus 20 and an AC electric utility grid 26. The power electronics of the power supply 30 are configured to allow only unidirectional power flow from the utility grid 26 to the DC bus 20. The unidirectional power flow allows the electric utility grid 26, when connected, to supply power to the DC bus 20, supplementing the power provided by the generating sources 18, 28 and energy storage system 16 if the demand from the loads 22, 24 connected to the power system exceed the power supplied by the generating sources 18, 28 and the energy storage system 16.

A DC-to-DC regulator (not shown) can be electrically coupled between the DC bus 20 and a DC load 22 operating at a different voltage level than the voltage on the DC bus 20. It is contemplated that any number and combination of loads can be connected to the system, such that a load can be connected to the DC bus 20 either directly, through a converter 12, through a DC-to-DC converter, or any combination or multiple thereof.

The power supply 30 can be any suitable type of device where AC to DC power conversion is unidirectional. Such devices range from a basic rectifier with a single phase, to a multiphase AC to DC rectification device with inherent reverse power blocking power devices such as diodes, to a power switching power supply with fully-integrated advanced controls and switching devices to convert AC to DC. In a specific aspect, the power supply can be one or more MEAN WELL DPU-3200 series power supplies available from MEAN WELL USA in Fremont, CA. Many readily-available devices in the market are used to power DC loads using an AC grid (for example, laptop computers, DC lighting, industrial applications, etc.). The power supply 30 of the present disclosure is similar in concept and components where their purpose, use, and configurability are leveraged for optimization and adjustability within a microgrid system to use utility power without the need for an interactive inverter or related requirements.

The power supply 30 can have a DC output that is adjustable and configurable and used for coordination and prioritization of the connected energy resources and also to protect from over discharging the energy storage system 16 when a regulator 14 is not being used. This can also be used to protect the DC bus 20 from collapse when the loads 22, 24 exceed the generation and storage capabilities at any given time.

In operation, each converter 12 and regulator 14 operates independently of the other converters 12 and regulators 14 to supply power to the DC bus 20. Further detail related to the operation and configuration of the power system 10 is available in co-owned U.S. patent application Ser. No. 16/811,624 and in co-owned U.S. Pat. No. 8,008,808, each of which is incorporated herein by reference to the extent it does not conflict herewith.

Figure 2:
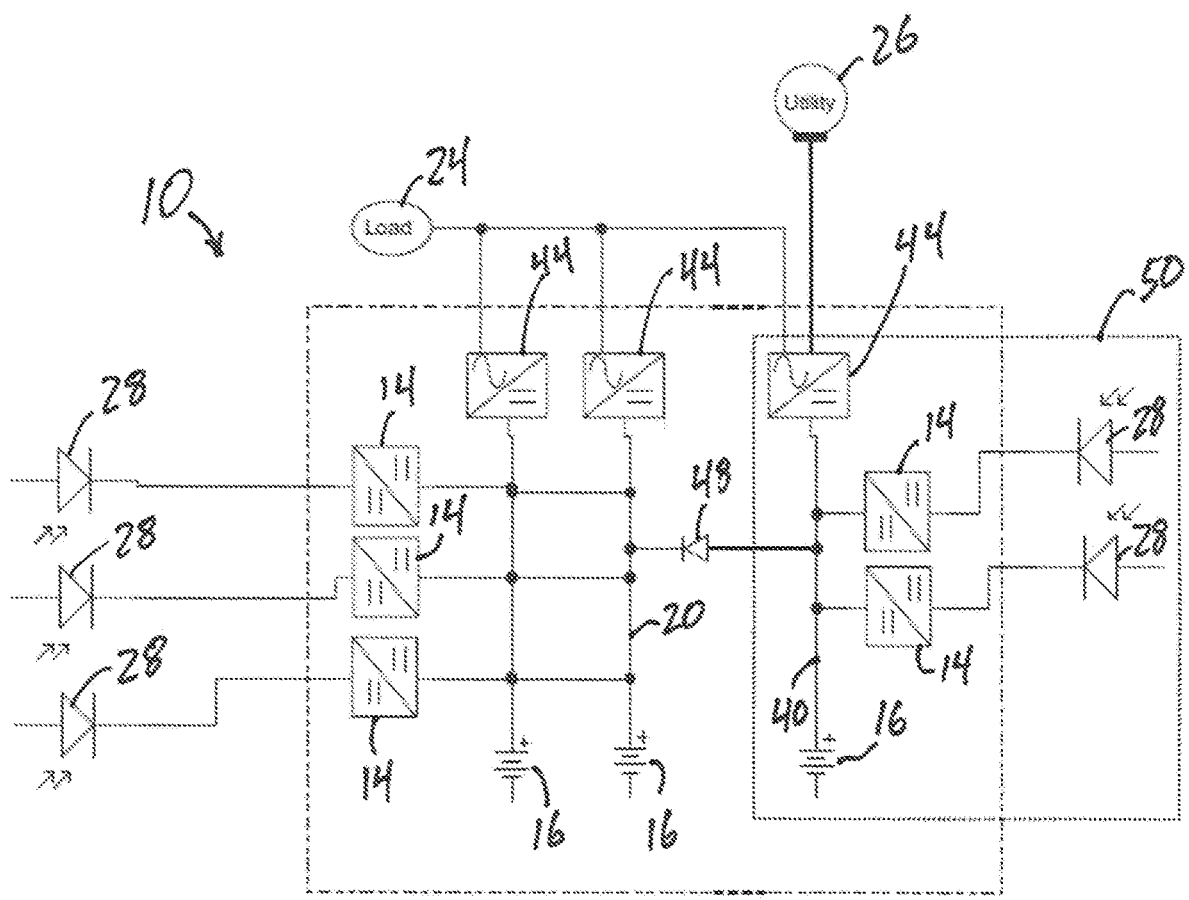
FIG. 2 is a schematic representation of an alternative aspect of a local generation and storage capacity of the present disclosure connected to a load and to an electric utility grid.

In an alternative aspect of the power system 10 of the present disclosure illustrated in FIG. 2, the power system 10 can include a hybrid power system node 50 interposed between power supply 30 and the electric utility grid 26. The hybrid power system node 50 can include additional generating sources 18, 28 and additional energy storage system 16, along with their associated converters 12 and regulators 14 as appropriate electrically connected to a second DC bus 40. In this aspect, the hybrid power system node 50 is electrically connected to the electric utility grid 26 through a smart or grid-interactive inverter 44 of the type described above. The hybrid power system node 50 is also electrically connected to the remainder of the power system 10 through a diode device or unidirectional regulator 48 such that the second DC bus 40 can supply the first DC bus 20, but the first DC bus 20 cannot supply the second DC bus 40. As a result, the first DC bus 20 also cannot back feed to the electric utility grid 26 and only a select percentage of the power system 10 is considered interactive with the grid and available to feed back into the utility grid. In this manner, the remainder of the power system 10 looks like just another load to the second DC bus 40.

In this aspect the hybrid power system node 50 can interact with the electric utility grid 26 through the smart inverter 44 in the manner described above without affecting the remainder of the power system 10. The power system 10 as a whole can cooperate with utility rules and commands while keeping the remainder of the power system 10 behind the regulator 48 opaque to the electric utility grid 26.

A goal of this aspect is not to hide a portion of the power system 10 from a utility, but to keep the capacity of the grid-interactive portion (in this aspect the hybrid power system node 50) of the power system 10 below limits or thresholds set by the utility. This arrangement allows for a larger system (for example, greater than a threshold such as 20KW as defined by a utility) while still allowing a grid interconnect with net metering below a threshold because the only part of the system that is interactively connected to the grid would be under their defined threshold. The capacity and hardware of the hybrid power system node 50 can be limited to meet the net metering requirements of the utility while still providing the full rating of the power system 10 needed to support an anticipated larger load.

It should be understood that the present disclosure is not limited in its application to the details of construction and arrangements of the components set forth herein. The present disclosure is capable of other aspects and of being practiced or earned out in various ways. Variations and modifications of the foregoing are within the scope of the present disclosure. It also being understood that the present disclosure disclosed and defined herein extends to all alternative combinations of two or more of the individual features mentioned or evident from the text and/or drawings. All of these different combinations constitute various alternative aspects of the present disclosure. The aspects described herein explain the best modes known for practicing the present disclosure and will enable others skilled in the art to use the present disclosure.

When introducing elements of the present disclosure or exemplary aspects or implementation(s) thereof, the articles "a," "an," "the," and "said" are intended to mean that there are one or more of the elements. The terms "comprising," "including," and "having" are intended to be inclusive and mean that there can be additional elements other than the listed elements.

While the foregoing is directed to implementations of the present disclosure, other and further implementations of the present disclosure can be devised without departing from the basic scope thereof, and the scope thereof is determined by the claims that follow.

What is claimed is:

1. A power system connectable to an electric utility grid, comprising:
   a first local bus connected to a first non-grid source of electrical energy; and
   a second local bus connected to a second non-grid source of electrical energy, wherein the second local bus is electrically connected to the first bus through a unidirectional regulator configured to allow electricity to pass from the second local bus to the first local bus and to block electricity flow from the first local bus to the second local bus, and wherein the second local bus is electrically connected to the electric utility grid through a bidirectional smart inverter.

2. The power system of claim 1, further comprising a local load.

3. The power system of claim 1, wherein the first non-grid source of electrical energy is a photovoltaic array.

4. The power system of claim 1, wherein the first non-grid source of electrical energy is an energy storage system.

5. The power system of claim 1, wherein the first non-grid source of electrical energy is a generator.

6. The power system of claim 1, wherein the first non-grid source of electrical energy is a photovoltaic array, the power system further comprising an energy storage system.

7. The power system of claim 1, wherein the first local bus is a DC bus.

8. The power system of claim 1, wherein the second non-grid source of electrical energy is a photovoltaic array.

9. The power system of claim 1, wherein the second non-grid source of electrical energy is an energy storage system.

10. The power system of claim 1, wherein the second non-grid source of electrical energy is a generator.

11. A power system connectable to an electric utility grid, comprising:
   a first local bus connected to a first non-grid source of electrical energy, wherein the first non-grid source of energy is a photovoltaic array, an energy storage system, or a generator; and
   a second local bus connected to a second non-grid source of electrical energy, wherein the second non-grid source of energy is a photovoltaic array, an energy storage system, or a generator, wherein the second local bus is electrically connected to the first bus through a unidirectional regulator configured to allow electricity to pass from the second local bus to the first local bus and to block electricity flow from the first local bus to the second local bus, and wherein the second local bus is electrically connected to the electric utility grid through a bidirectional smart inverter.

12. The power system of claim 11, further comprising a local load electrically connected to the first local bus.

13. The power system of claim 11, wherein the first local bus is a DC bus.

14. The power system of claim 11, wherein the first non-grid source of electrical energy is a photovoltaic array.

15. The power system of claim 11, wherein the first non-grid source of electrical energy is an energy storage system.

16. The power system of claim 11, wherein the first non-grid source of electrical energy is a generator.

17. The power system of claim 11, wherein the second non-grid source of electrical energy is a photovoltaic array.

18. The power system of claim 11, wherein the second non-grid source of electrical energy is an energy storage system.

19. The power system of claim 11, wherein the second non-grid source of electrical energy is a generator.

20. A power system connectable to an electric utility grid, comprising:
   a first local bus connected to a first non-grid source of electrical energy; and
   a second local bus connected to a second non-grid source of electrical energy, wherein the second local bus is electrically connected to the first bus through a unidirectional regulator configured to allow electricity to pass from the second local bus to the first local bus and to block electricity flow from the first local bus to the second local bus such that the first local bus cannot supply electricity to the electric utility grid, and wherein the second local bus is electrically connected to the electric utility grid through a bidirectional smart inverter.

* * * * *